July 12, 1966 F. ESPINO 3,259,980

VEGETABLE CUTTER

Filed May 21, 1964

INVENTOR
*Florentino Espino.*

# United States Patent Office 3,259,980
Patented July 12, 1966

3,259,980
VEGETABLE CUTTER
Florentino Espino, 218 E. 46th St., Hialeah, Fla.
Filed May 21, 1964, Ser. No. 369,062
4 Claims. (Cl. 30—279)

This invention relates to the kitchen utensil art, and more particularly to that branch of kitchen utensils that has to do with cutlery.

While there are a countless number of different types of kitchen utensils that have cutting or shap edges, none is especially adaptable for use on curved surfaces such as tomatoes and the like.

It is, therefore, the main object of this invention of a vegetable cutter to provide a plurality of cutting edges that can cut or scrape the surface of tomatoes, potatoes and the like without the use of a complicated structure.

Another object of this invention is to provide a vegetable cutter that can quickly be sharpened.

Another object of this invention is to provide a vegetable cutter from which any one of its plurality of blades can be replaced should it become damaged or broken.

Another object of this invention is to provide a vegetable cutter that can be manufactured and retailed at a price far below vegetable cutters now on the market by reason of its simplicity in construction.

Still another object of this invention is to provide a vegetable cutter of the character herein described that can be used to slice, peel, or shred any vegetable or fruit having a curved, flat and/or combination of curved and flat surfaces.

The invention will be fully and comprehensively understood from a consideration of the following detailed description when read in connection with the accompanying drawing which forms a part of the application.

Figure 1:
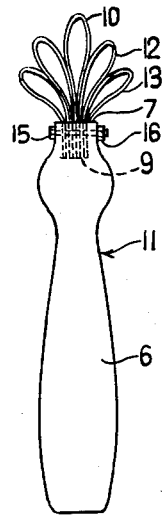
FIGURE 1 is a front view of this vegetable cutter.
Figure 2:
FIGURE 2 is a side view of this vegetable cutter.
Figure 3:
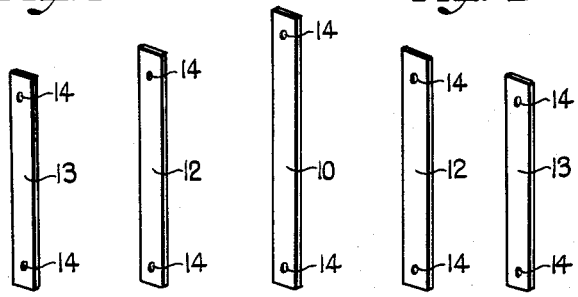
FIGURE 3 is an exploded perspective view of the plurality of cutting blades used to make up this vegetable cutter.
Figure 4:
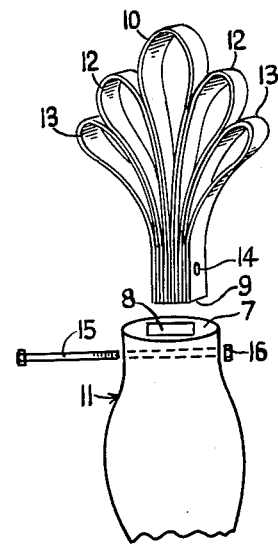
FIGURE 4 is an exploded perspective view of the different parts of this vegetable cutter in position for assembly.

Referring now to FIGURE 1 of the drawing, it will be seen that this vegetable cutter consists of a handle 6 that is contoured to best fit the hand, and which has a flat top 7 in the center of which is located a rectangular opening 8 (shown only in FIGURE 4) in which is inserted the ends 9 of a plurality of rectangular flexible steel cutting blades the longest of which is indicated in the drawing by the numeral 10 and which is located in the center of the vegetable cutter that is indicated in its entirety in the attached drawing by the numeral 11.

In the present and preferred embodiment of this vegetable cutter, the cutting portion of this invention consists of not only the aforesaid blade 10, but two other rectangular blades of shorter length that are indicated by the numeral 12. These last two mentioned blades which are identical to one another are located one on each side of the aforesaid blade 10. Two more blades 13 of still shorter length, are located one on each side of blade 12, thereby forming the plurality of cutting blades mentioned throughout this specification and its appended claims. All of the cutting blades are, as previously stated, made from flexible steel and have an opening 14 in each end thereof that are in perfect alignment with one another when the blades are assembled one next to the other as shown in the attached drawing after they have been bent over in the manner best illustrated in FIGURES 1 and 4 of the drawing providing elongated loops with adjacent surfaces of the end portions of the blades in face to face contact forming a tang. The blades now have their ends inserted in the aforesaid rectangular opening 8 in the upper end of the handle 6 and a rather long bolt 15 is placed in the opening in the handle and on through the opening 14 in the ends of the blades thereby firmly securing the same in place. A nut 16 is now screwed tightly onto the end of the bolt, thereby completing the assembly of this vegetable cutter.

The way in which this vegetable cutter is used is obvious to any housewife or others who have ever handled kitchen utensils and the like. The handle 6 is taken in one hand and the plurality of cutting blades are either scraped over the surface of the vegetable or fruit which is held in the other hand, or they are sliced down through the same, depending upon which operation is desired. Shredding may also be done with this vegetable cutter in the manner so well known by nearly everyone as to need no detail description of its actual operation.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specially described embodiment of the invention may be made without departing from the scope of the invention as set forth in what is claimed.

What I now claim as my invention of a vegetable cutter and desire to secure by Letters Patent from the United States Patent Office is:

1. A vegetable cutter, comprising a handle contoured to fit one's hand, said handle having a rectangular opening in one end thereof, a plurality of elongated, rectangular, flexible steel cutting blades of different lengths, each blade bent to form an elongated loop with the end portions of the blade in face to face contact, a shorter blade on each side of the longest blade, and a still shorter blade on the outer side of each shorter blade, the blades placed with adjacent loops in contact and adjacent surfaces of the end portions in face to face contact, the end portions of said blades forming a tang extending into the opening in said handle.

2. The combination of claim 1 in which one edge of each blade is sharpened.

3. The combination of claim 1 in which both edges of each blade are sharpened.

4. The combination of claim 3 including a bolt extending transversely through said handle and through the end portions of the blades to secure the end portions in the opening of the handle.

References Cited by the Examiner
UNITED STATES PATENTS

| | | |
|---|---|---|
| 1,578,128 | 3/1926 | Jacobson. |
| 2,006,668 | 7/1935 | Chang _____ 30—279 X |
| 2,210,769 | 8/1940 | Muker _____ 30—279 X |

WILLIAM FELDMAN, Primary Examiner.
JAMES L. JONES, JR., Examiner.